US010401592B2

(12) United States Patent
Shin et al.

(10) Patent No.: US 10,401,592 B2
(45) Date of Patent: Sep. 3, 2019

(54) IMAGE CAPTURING OPTICAL SYSTEM

(71) Applicant: Samsung Electronics Co., Ltd., Gyeonggi-do (KR)

(72) Inventors: Hyun-Jun Shin, Gyeonggi-do (KR); Byung-Kwon Kang, Gyeonggi-do (KR); Han-Eung Kim, Gyeonggi-do (KR); Jeong-Kil Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 348 days.

(21) Appl. No.: 15/338,954

(22) Filed: Oct. 31, 2016

(65) Prior Publication Data
US 2017/0123186 A1  May 4, 2017

(30) Foreign Application Priority Data
Oct. 30, 2015 (KR) .................. 10-2015-0152633

(51) Int. Cl.
G02B 9/62 (2006.01)
G02B 13/00 (2006.01)
G02B 5/20 (2006.01)
G02B 27/00 (2006.01)

(52) U.S. Cl.
CPC ......... G02B 13/0045 (2013.01); G02B 5/208 (2013.01); G02B 9/62 (2013.01); G02B 27/0025 (2013.01)

(58) Field of Classification Search
CPC ............... G02B 13/0045; G02B 5/208; G02B 27/0025; G02B 9/62
See application file for complete search history.

(56) References Cited

U.S. PATENT DOCUMENTS

| 8,379,323 B2 | 2/2013 | Huang et al. |
| 8,743,483 B2 | 6/2014 | Hsu et al. |
| 2016/0282588 A1* | 9/2016 | Sekine ............... G02B 9/62 |

* cited by examiner

Primary Examiner — Joseph P Martinez
(74) Attorney, Agent, or Firm — The Farrell Law Firm, P.C.

(57) ABSTRACT

Disclosed is an image capturing optical system including, in order from an object side, a first lens having positive refractive power and concave upwards, a second lens having positive refractive power, a third lens having negative refractive power, a fourth lens having positive refractive power, a fifth lens having positive refractive power and including at least one inflection points on the object side or an upper surface, and a sixth lens having negative refractive power and being convex upwards.

9 Claims, 16 Drawing Sheets

IMAGE CAPTURING OPTICAL SYSTEM

PRIORITY

This application claims priority under 35 U.S.C. § 119(a) to a Korean Patent Application filed in the Korean Intellectual Property Office on Oct. 30, 2015 and assigned Serial No. 10-2015-0152633, the contents of which are incorporated herein by reference.

BACKGROUND

1. Field of the Disclosure

The present disclosure relates generally to optical systems for image capturing, and more particularly, to high-performance image capturing optical systems having six lenses.

2. Description of the Related Art

Mobile communication terminals, personal digital assistants (PDAs), smartphones, or other mobile communication means implement various types of additional functions as well as basic communication functionality due to more frequent use and diversified services as offered through communication technology. In particular, there is increasing demand for camera modules equipped in mobile communication means to function as convergence devices offering various functions, such as autofocusing, high-definition video capturing, and quick response (QR) code scanning in addition to simple picturing. Therefore, camera modules equipped in mobile communication means now present smaller and higher-density pixels and higher-performance optical characteristics to implement high-quality image capturing devices with an optical system including four or five lenses.

Pursuit of a reduced size in portable electronic devices limits the space for equipping modules therein and requires downsizing of such modules. As such, camera modules need to be made slimmer. However, demand for high-quality, high-definition camera modules is increasing.

Conventional optical systems which consist of four or five lenses cannot implement high-end camera modules that satisfy the demand and cannot be equipped in slim portable electronic devices in a manner that satisfies the required optical and aberration characteristics of modern portable electronic devices.

As such, there is a need in the art for an improved image capturing optical system that maintains reduced size yet promotes high performance in the portable electronic device.

SUMMARY

The present disclosure has been made to address at least the-mentioned problems and/or disadvantages and to provide at least the advantages described below.

Accordingly, an aspect of the present disclosure is to provide a slim, low F-number image capturing optical system having six lenses, which include positive (+) refractive power lenses and negative (−) refractive lenses adequately arranged to fit the optical characteristics considering the aberration characteristics from the object size, to present high resolution and high performance while maintaining a reduced size.

According to an aspect of the present disclosure, an image capturing optical system includes, in order from an object side, a first lens having positive refractive power and being concave upwards, a second lens having positive refractive power, a third lens having negative refractive power, a fourth lens having positive refractive power, a fifth lens having positive refractive power and including at least one inflection point on the object side or an upper surface, and a sixth lens having negative refractive power and being convex upwards.

According to another aspect of the present disclosure, an image capturing optical system includes, in order from an object side, a first lens having negative refractive power and being concave upwards, a second lens having positive refractive power, a third lens having negative refractive power, a fourth lens having positive refractive power, a fifth lens having positive refractive power and including at least one inflection point on the object side or an upper surface, and a sixth lens having negative refractive power and being convex upwards.

According to another aspect of the present disclosure, an image capturing optical system includes, in order from an object side, a first lens having positive or negative refractive power and being concave upwards, a second lens having positive refractive power, a third lens having negative refractive power, a fourth lens having positive refractive power, a fifth lens having positive refractive power and including at least one inflection point on the object side or an upper surface, and a sixth lens having negative refractive power and being convex upwards, wherein the image capturing optical system satisfies at least one of the following:

$$0.45<|f_2/f_3|<1.0,$$

$$1.5<f/f_2<2.5,$$

$$4.5<OTL5/CT5<10.0, \text{ and}$$

$$0.35<|Vd_3/Vd_4|=1$$

wherein f is a focal length of the image capturing optical system, $f_2$ is a focal length of the second lens, $f_3$ is a focal length of the third lens, $f_2$ is a focal length of the second lens, OTL5 is a distance on an optical axis from an object-side surface of the first lens to an upper surface of the fifth lens, CT5 is a thickness of a center of the fifth lens, $Vd_3$ is an Abbe number of the third lens, and $Vd_4$ is an Abbe number of the fourth lens.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
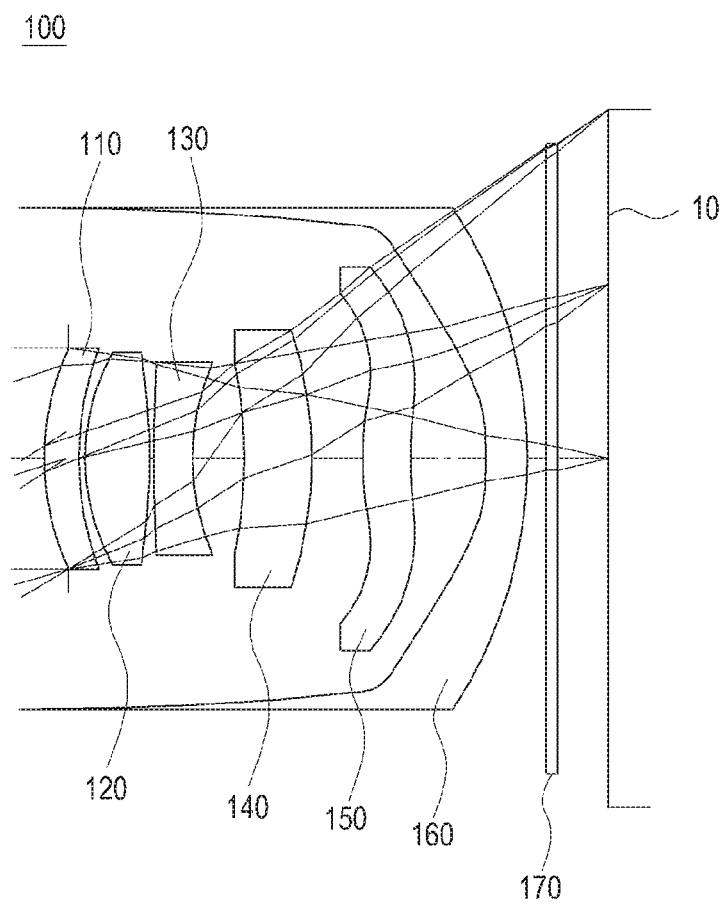
FIG. 1A illustrates an inner structure of an image capturing optical system according to a first embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the expressions "have," "may have," "include," or "may include" a feature, such as a number, function, operation, or a component such as a part, indicate the existence of the feature and do not exclude the existence of other features.

As used herein, the expressions "A or B," "at least one of A and/or B," or "one or more of A and/or B" may include all possible combinations of A and B. For example, "A or B," "at least one of A and B," "at least one of A or B" may indicate any of (1) including at least one A, (2) including at least one B, and (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be referred to as a second component, and vice versa without departing from the scope of the present disclosure.

It will be understood that when an element, such as a first element, is referred to as being (operatively or communicatively) "coupled with/to," or "connected with/to" another element, such as a second element, the first element can be coupled or connected with/to the second element directly or via a third element. In contrast, it will be understood that when the first element is referred to as being "directly coupled with/to" or "directly connected with/to" the second element, no third element intervenes between the first and second elements.

As used herein, the expression "configured (or set) to" may be interchangeably used with the expressions "suitable for," "having the capacity to," "designed to," "adapted to," "made to," or "capable of" depending on circumstances. The expression "configured (or set) to" does not essentially indicate "specifically designed in hardware to." Rather, "configured to" may indicate that a device can perform an operation together with another device or parts. For example, the term "processor configured (or set) to perform A, B, and C" may indicate a generic-purpose processor, such as a central processing unit (CPU) or application processor that may perform the operations by executing one or more software programs stored in a memory device or a dedicated processor, such as an embedded processor for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to an embodiment of the present disclosure, the wearable device may include at least one of an accessory-type device, such as a watch, a ring, a bracelet, an anklet, a necklace, glasses, contact lenses, or a head-mounted device (HMD), a fabric- or clothes-integrated device, such as electronic clothes, a body attaching-type device, such as a skin pad or tattoo, or a body implantable device, such as an implantable circuit.

According to an embodiment of the present disclosure, the electronic device may be a home appliance such as a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box, such as Samsung HomeSync™, Apple TV™, or Google TV™, a gaming console (Xbox™, PlayStation™), an electronic dictionary, an electronic key, a camcorder, or an electronic picture frame.

According to an embodiment of the present disclosure, examples of the electronic device may include at least one of various medical devices, such as diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device, such as a sailing navigation device or a gyro compass), avionics, security devices, vehicular head units, industrial or home robots, automated teller machines (ATMs), point of sales (POS) devices, or Internet of Things (IoT) devices, such as a light bulb, various sensors, an electric or gas meter, a sprinkler, a fire alarm, a thermostat, a street light, a toaster, fitness equipment, a hot water tank, a heater, or a boiler.

According to embodiments of the disclosure, examples of the electronic device may at least one of part of a piece of furniture or building/structure, an electronic board, an electronic signature receiving device, a projector, or various measurement devices, such as devices for measuring water, electricity, gas, or electromagnetic waves. The electronic device may be one or a combination of the-listed devices, and may be a flexible electronic device. The electronic device disclosed herein is not limited to the-listed devices, and may include new electronic devices depending on the development of technology.

Technical configurations, operations, and effects of the image capturing optical system according to the present disclosure will be apparent from the following detailed description of embodiments of the present disclosure taken in conjunction with the accompanying drawings.

However, the lens diagrams in the embodiments are slightly exaggerated in thickness, size, and shape for illustration purposes, and in particular, the spherical or aspherical shape as suggested herein is merely an example, and the present disclosure is not limited thereto.

According to an embodiment of the present disclosure, an image capturing optical system 100 may include six lenses arranged in order from an object side, including a first lens 110, a second lens 120, a third lens 130, a fourth lens 140, a fifth lens 150, and a sixth lens 160.

In the image capturing optical system 100 including six lenses, the first lens 110 may have at least one of a positive (+) refractive power or a negative (−) refractive power and may be concave upwards. The second lens 120 may have a positive (+) refractive power, the third lens 130 may have a negative (−) refractive power, and the fourth lens 140 may have a positive (+) refractive power. The fifth lens 150 may have a positive (+) refractive power and form at least one inflection point on the object side or upper surface. The sixth lens 160 may be convex upwards to have a negative (−) refractive power.

According to an embodiment of the present disclosure, the image capturing optical system 100 may have an image capturing device 10 (or image sensor) disposed on a rear surface of the sixth lens 160 to allow image information on an object to be incident thereon. The image information on the object entering the image capturing optical system 100 may pass through the first lens 110, second lens 120, third lens 130, fourth lens 140, fifth lens 150, and sixth lens 160 to the image capturing device 10 that corresponds to an upper surface thereof.

An optical filter 170 may be further provided between the sixth lens 160 and the upper surface, and may be an infrared (IR) cut-off filter that transmits visible light while externally discharging to stop IR light from reaching the upper surface.

In the image capturing optical system 100, any one or both surfaces of the first lens 110, second lens 120, third lens 130, fourth lens 140, fifth lens 150, and sixth lens 160 may be an aspherical surface.

In the image capturing optical system 100 configured as described, an image or light from an external light source may pass, in order, through the first lens 110 having a positive or negative refractive power and concave upwards, the second lens 120 having a positive refractive power, the third lens 130 having a negative refractive power, the fourth lens 140 having a positive refractive power, the fifth lens 150 having a positive refractive power and having at least one inflection point on the object size or upper surface, the sixth lens 160 having a negative refractive power and convex upwards, and the IR cut-off filter to form an image on the image capturing device 10. As the image capturing optical system 100 according to an embodiment of the present disclosure has such arrangement, the length to the image capturing device 10 may be reduced, various aberrations may be minimized, and a high resolution may be achieved.

Meanwhile, as mentioned, the image capturing optical system 100 according to the present disclosure may satisfy at least one of the following Inequalities, enabling aberration correction.

$$0.45 < |f_2/f_3| < 1.0 \qquad (1)$$

In Inequality (1), $f_2$ may denote focal length of second lens 120, and $f_3$ may denote focal length of third lens 130.

Inequality (1) represents the focal length of the second lens 120 in a focal length ratio relative to the third lens 130. Over the upper limit of Inequality (1), the focal length of the second lens 120 may increase relative to the focal length of the third lens 130, resulting in an increased size of the optical system, while over the lower limit thereof, the optical system may enjoy a reduced size, but aberration may be difficult to correct.

In other words, according to an embodiment of the present disclosure, when the image capturing optical system 100 is designed with a value larger or smaller than that a value that satisfies Inequality (1), its image capturing performance may be reduced, causing a deterioration of productivity and difficulty in obtaining optical capability.

$$1.5 < f/f_2 < 2.5 \qquad (2)$$

In Inequality (2), $f_2$ may denote focal length of the image capturing optical system 100, and $f_2$ may denote focal length of second lens 120.

Inequality (2) represents the focal length of the optical system in a focal length ratio relative to the second lens 120. Over the upper limit of Equation (2), the focal length of the optical system may increase relative to the focal length of the second lens 120, resulting in an increased size of the lenses arranged therebehind, while over the lower limit thereof, the optical system may enjoy a reduced size, but aberration may be difficult to correct.

In other words, when the optical system is designed to have a value larger or smaller than that a value that satisfies Inequality (2), its refractivity and sensitivity may be reduced.

$$4.5 < OTL5/CT5 < 10.0 \qquad (3)$$

In Inequality (3), OTL5 may denote distance on optical axis from object-side surface of first lens 110 to upper surface of fifth lens 150, and CT5 may denote the thickness of the center of the fifth lens 150.

Inequality (3) represents the distance on optical axis from the object-side surface of the first lens 110 to the upper surface of the fifth lens 150 relative to the thickness of the center of the fifth lens 150. Over the upper limit of Inequality (3), the distance on optical axis to the fifth lens 150 may increase relative to the distance on optical axis, and over the lower limit of Inequality (3), the distance on optical axis from the object-side surface of the first lens 110 to the upper surface of the fifth lens 150 may be reduced, but it may be difficult to implement optical characteristics or correct aberration. Accordingly, an embodiment of the present disclosure sets forth that the image capturing optical system 100 may present enhanced optical characteristics by satisfying Equation (1).

$$0.35 < |Vd_3/Vd_4| = 1 \qquad (1)$$

In Equation (1), $Vd_3$ may denote the Abbe number of third lens 130, and $Vd_4$ may denote the Abbe number of fourth lens 140.

Equation (1) represents the Abbe number of the third lens 130 relative to the Abbe number of the fourth lens 140. Over the upper limit or lower limit of Equation (1), the chromatic aberration and optical characteristics of the image capturing optical system 100 may be deteriorated. Accordingly, an embodiment of the present disclosure sets forth that the image capturing optical system 100 may present enhanced optical characteristics by satisfying Equation (1).

According to the first to eighth embodiments of the present disclosure described below, the image capturing optical system 100 may include, in order from an object side, a first lens 110 having a positive (+) or negative (−) refractive power and concave upwards, a second lens 120 having a positive (+) refractive power, a third lens 130 having a negative (−) refractive power, a fourth lens 140 having a positive (+) refractive power, a fifth lens 150 having a positive (+) refractive power and having at least one inflection points on the object side or upper surface, and a sixth lens 160 having a negative (−) refractive power and convex upwards.

The spherical surface used in each embodiment may be obtained from Equation (1), K denotes a conic constant, and E and its following number used for aspherical coefficients A, B, C, and D denote the power of 10. For example, E+02 may denote $10^2$, and E-02 may denote $10^{-2}$.

$$Z = \frac{cY^2}{1 + \sqrt{1 - (1 + K)c^2 Y^2}} + AY^4 + BY^6 + CY^8 + DY^{10} + EY^{12} \qquad (2)$$

In Equation (2),
Z: distance on optical axis from the vertex of lens
Y: distance in direction perpendicular to optical axis
c: reciprocal (=1/R) of radius of curvature at vertex of lens
K: conic constant
A, B, C, D, and E: aspherical coefficient First Embodiment Table 1 below represents numerical examples as per Inequalities 1-3 and Equation 1 according to an embodiment of the present disclosure, and Table 2 below represents aspherical coefficients of Inequality (1)).

Figure 1B:
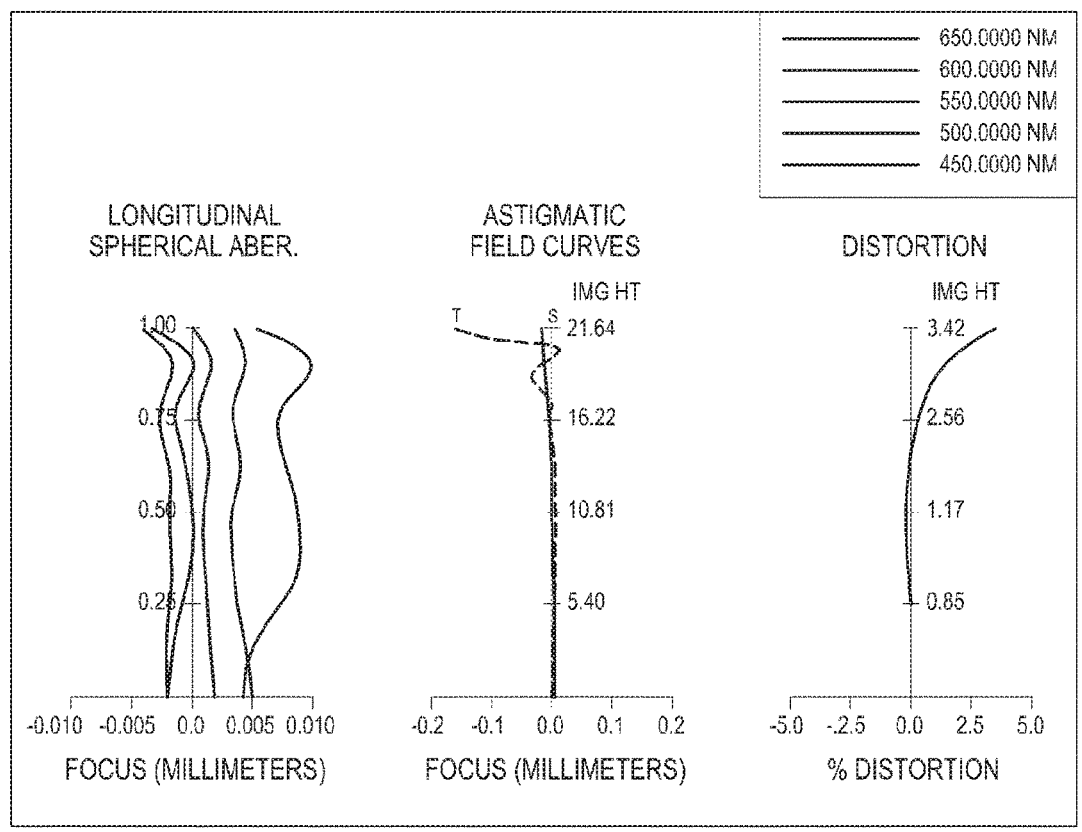
FIG. 1B illustrates an aberration diagram of an image capturing optical system according to the first embodiment of the present disclosure.

FIG. 1A illustrates an inner structure of an image capturing optical system 100 according to a first embodiment of the present disclosure. FIG. 1B illustrates an aberration diagram of an image capturing optical system 100 according to the first embodiment of the present disclosure.

Referring to FIGS. 1A and 1B and Tables 1 and 2, according to a first embodiment of the present disclosure, in the image capturing optical system 100, the valid focal length f of the optical system is 5.119 mm, the focal length f1 of the first lens 110 is −129.09 mm, the focal length f2 of the second lens 120 is 2.65 mm, the focal length f3 of the third lens 130 is −4.65 mm, the focal length f4 of the fourth lens 140 is 117.50 mm, the focal length f5 of the fifth lens 150 is −15.33 m, and the focal length f6 of the sixth lens 160 is −5.65 mm.

TABLE 1

| Surface No. | Radius of curvature | Thickness | Refractive index | Remarks |
|---|---|---|---|---|
| 1 | 1.912 | 0.330 | 1.544 | First lens 110 |
| 2 | 1.748 | 0.056 | | |
| 3 | 1.763 | 0.630 | 1.544 | Second lens 120 |
| 4 | −7.349 | 0.044 | | |
| 5 | 8.043 | 0.392 | 1.642 | Third lens 130 |
| 6 | 2.132 | 0.507 | | |
| 7 | −7.141 | 0.661 | 1.64 | Fourth lens 140 |
| 8 | −6.755 | 0.514 | | |
| 9 | 2.381 | 0.455 | 1.544 | Fifth lens 150 |
| 10 | 3.110 | 0.745 | | |
| 11 | −2.885 | 0.400 | 1.535 | Sixth lens 160 |
| 12 | −68.885 | 0.188 | | |
| 13 | Infinity | 0.110 | 1.517 | IRCF |
| 14 | Infinity | 0.504 | | |
| 15 | Infinity | −0.002 | | Image Plane |

In Table 1, IRCF indicates an infrared ray cut-off filter, and a reference wavelength of refractive index is 587.6 nm.

TABLE 2

| Types | 1 | 2 | 3 | 4 | 5 | 6 |
|---|---|---|---|---|---|---|
| Conic constant (K) | −1.44207 | −3.90228 | −0.00442 | 0.00000 | 51.43976 | 0.00000 |
| A(fourth-order term) | −0.02665 | −0.05085 | −0.07152 | −0.07499 | −0.16349 | −0.10636 |
| B(sixth-order term) | −0.00518 | −0.05419 | −0.00577 | 0.43197 | 0.49847 | 0.33917 |
| C(eighth-order term) | −0.02347 | 0.06343 | 0.04824 | −1.03991 | −1.10067 | −1.29398 |
| D(tenth-order term) | 0.03403 | 0.00289 | −0.04341 | 1.48670 | 1.55266 | 4.69707 |
| E(twelfth-order term) | −0.03007 | −0.03977 | 0.10124 | −1.40249 | −1.45561 | −11.59934 |

TABLE 2-continued

| Types | 7 | 8 | 9 | 10 | 11 | 12 |
|---|---|---|---|---|---|---|
| Conic constant (K) | 0.00000 | 0.00000 | 0.00000 | 0.00000 | −0.21824 | 0.00000 |
| A(fourth-order term) | −0.08162 | −0.13479 | −0.25662 | −0.20004 | −0.13297 | −0.11857 |
| B(sixth-order term) | 0.11465 | 0.18522 | 0.15434 | 0.10939 | 0.05792 | 0.06759 |
| C(eighth-order term) | −0.18889 | −0.22861 | −0.11623 | −0.06180 | 0.05626 | −0.01947 |
| D(tenth-order term) | 0.23975 | 0.23990 | 0.06914 | 0.02295 | −0.08588 | 0.00110 |
| E(twelfth-order term) | −0.19273 | −0.17673 | −0.02768 | −0.00373 | 0.05165 | 0.00103 |

According to the first embodiment of the present disclosure, Inequality (1) satisfies $|f_2/f_3|=0.576$. Inequality (2) satisfies $f/f_2=1.909$, Inequality (3) satisfies OTL5/CT5=7.891, and Equation (1) satisfies $Vd_3/Vd_4=0.957$.

Second Embodiment

Table 3 below represents numerical examples as per Inequalities (1)-(3) and Equation (1) according to a second embodiment of the present disclosure, different from the first embodiment, and Table 4 below represents aspherical coefficients of Inequality (1).

Figure 2A:
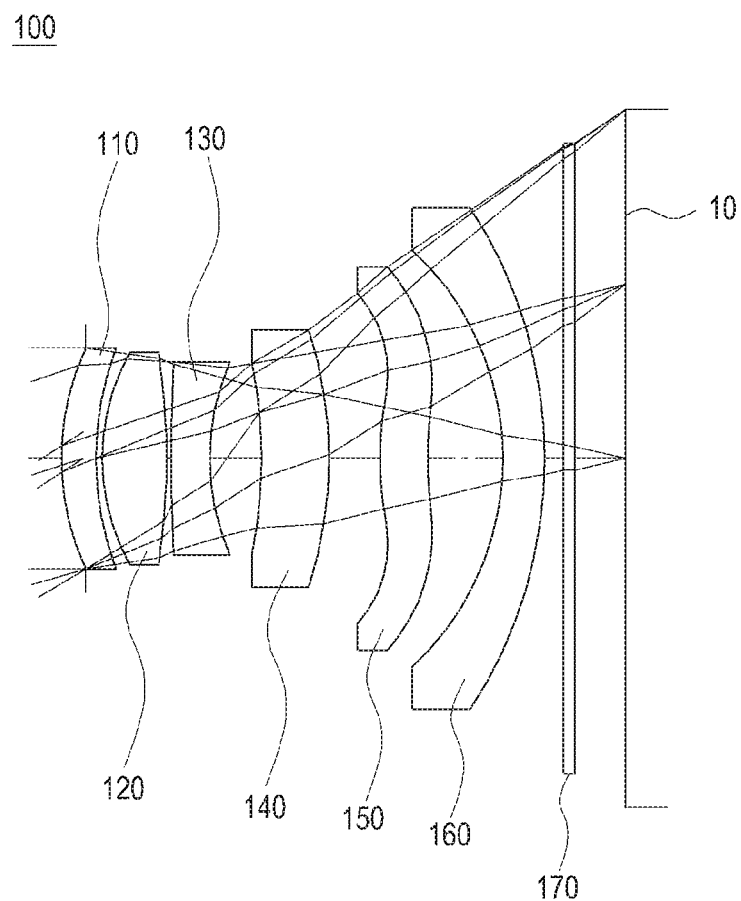
FIG. 2A illustrates an inner structure of an image capturing optical system according to a second embodiment of the present disclosure.
Figure 2B:
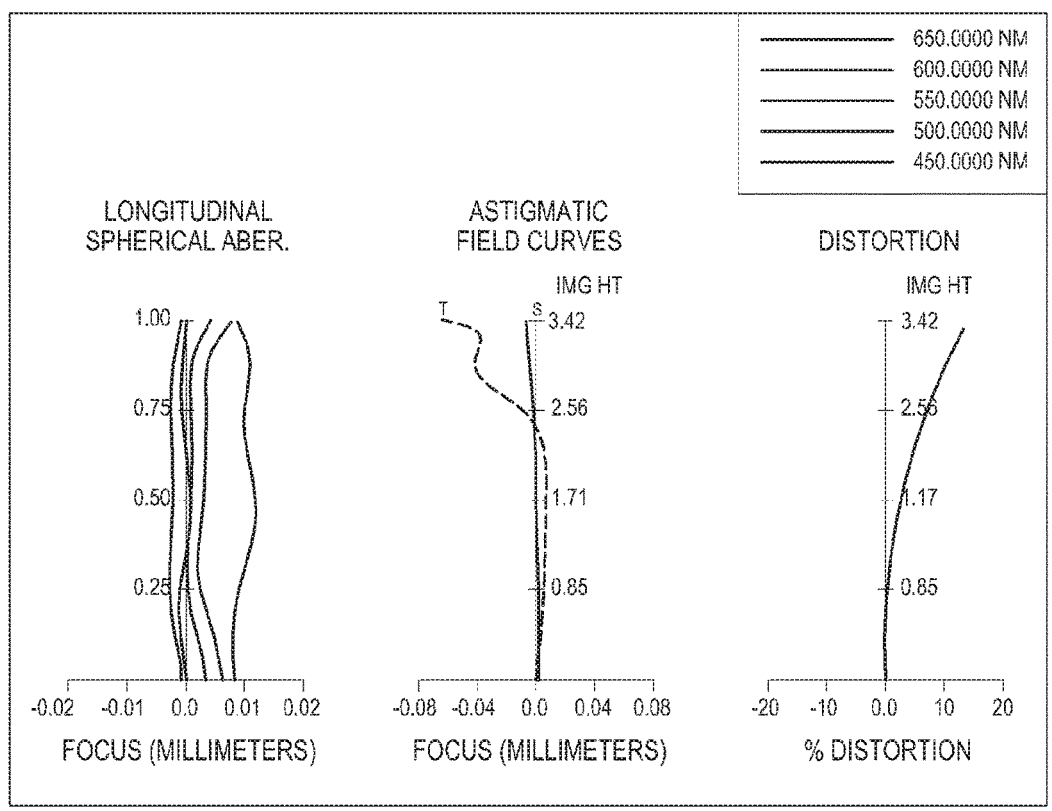
FIG. 2B illustrates an aberration diagram of an image capturing optical system according to the second embodiment of the present disclosure.

FIG. 2A illustrates an inner structure of an image capturing optical system 100 according to a second embodiment of the present disclosure. FIG. 2B illustrates an aberration diagram of an image capturing optical system 100 according to the second embodiment of the present disclosure.

Referring to FIGS. 2A and 2B and Tables 3 and 4, according to a second embodiment of the present disclosure, in the image capturing optical system 100, the valid focal length f of the optical system is 5.154 mm, the focal length f1 of the first lens 110 is −132.896 mm, the focal length f2 of the second lens 120 is 2.682 mm, the focal length f3 of the third lens 130 is −4.876 mm, the focal length f4 of the fourth lens 140 is 530.456 mm, the focal length f5 of the fifth lens 150 is 15.671 mm, and the focal length f6 of the sixth lens 160 is −5.531 mm.

TABLE 3

| Surface No. | Radius of curvature | Thickness | Refractive index | Remarks |
|---|---|---|---|---|
| 1 | 1.901 | 0.331 | 1.544 | First lens 110 |
| 2 | 1.739 | 0.062 | | |
| 3 | 1.756 | 0.634 | 1.544 | Second lens 120 |
| 4 | −7.483 | 0.039 | | |
| 5 | 8.018 | 0.350 | 1.642 | Third lens 130 |
| 6 | 2.208 | 0.558 | | |
| 7 | −5.864 | 0.671 | 1.64 | Fourth lens 140 |
| 8 | −6.021 | 0.487 | | |
| 9 | 2.321 | 0.446 | 1.544 | Fifth lens 150 |
| 10 | 2.975 | 0.781 | | |
| 11 | −2.833 | 0.400 | 1.535 | Sixth lens 160 |
| 12 | −71.725 | 0.188 | | |
| 13 | Infinity | 0.110 | 1.517 | IRCF |
| 14 | Infinity | 0.505 | | |
| 15 | Infinity | −0.003 | | Image Plane |

In Table 3, IRCF indicates an IR cut-off filter, and a reference wavelength of refractive index is 587.6 nm.

TABLE 4

| Types | 1 | 2 | 3 | 4 | 5 | 6 |
|---|---|---|---|---|---|---|
| Conic constant (K) | −1.43671 | −3.90726 | −0.00367 | 0.00000 | 51.55409 | 0.00000 |
| A(fourth-order term) | −0.02631 | −0.04918 | −0.07110 | −0.07497 | −0.16326 | −0.10011 |
| B(sixth-order term) | −0.00767 | −0.06552 | −0.01485 | 0.43191 | 0.49876 | 0.34525 |
| C(eighth-order term) | −0.01441 | 0.11504 | 0.08867 | −1.03987 | −1.10060 | −1.46446 |
| D(tenth-order term) | 0.01992 | −0.10334 | −0.12153 | 1.48676 | 1.55268 | 5.68464 |
| E(twelfth-order term) | −0.01945 | 0.07049 | 0.17599 | −1.40245 | −1.45557 | −14.79179 |

| Types | 7 | 8 | 9 | 10 | 11 | 12 |
|---|---|---|---|---|---|---|
| Conic constant (K) | 0.00000 | 0.00000 | 0.00000 | 0.00000 | −0.38627 | 0.00000 |
| A(fourth-order term) | −0.06970 | −0.13004 | −0.25846 | −0.19718 | −0.13297 | −0.12258 |
| B(sixth-order term) | 0.09215 | 0.17907 | 0.15965 | 0.10654 | 0.05792 | 0.07099 |
| C(eighth-order term) | −0.15010 | −0.22109 | −0.12438 | −0.05962 | 0.05626 | −0.02084 |

TABLE 4-continued

| | | | | | | |
|---|---|---|---|---|---|---|
| D(tenth-order term) | 0.18099 | 0.23018 | 0.07851 | 0.02196 | −0.08588 | 0.00151 |
| E(twelfth-order term) | 0.14003 | −0.17004 | −0.03547 | −0.00356 | 0.05165 | 0.00093 |

According to the second embodiment of the present disclosure, Inequality (1) satisfies $|f_2/f_3|=0.55$. Inequality (2) satisfies $f/f_2=1.92$, Inequality (3) satisfies OTL5/CT5=8.01, and Equation (1) satisfies $Vd_3/Vd_4=0.957$.

Third Embodiment

Table 5 below represents numerical examples as per Inequalities (1)-(3) and Equation (1) according to an embodiment of the present disclosure, and Table 6 below represents aspherical coefficients of Inequality (1).

Figure 3A:
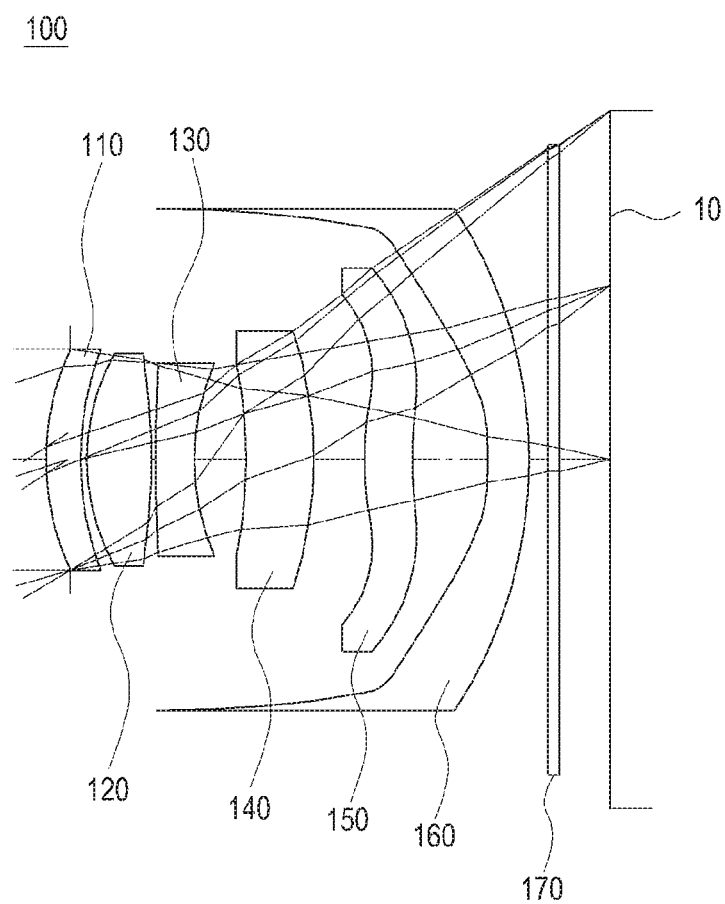
FIG. 3A illustrates an inner structure of an image capturing optical system according to a third embodiment of the present disclosure.
Figure 3B:
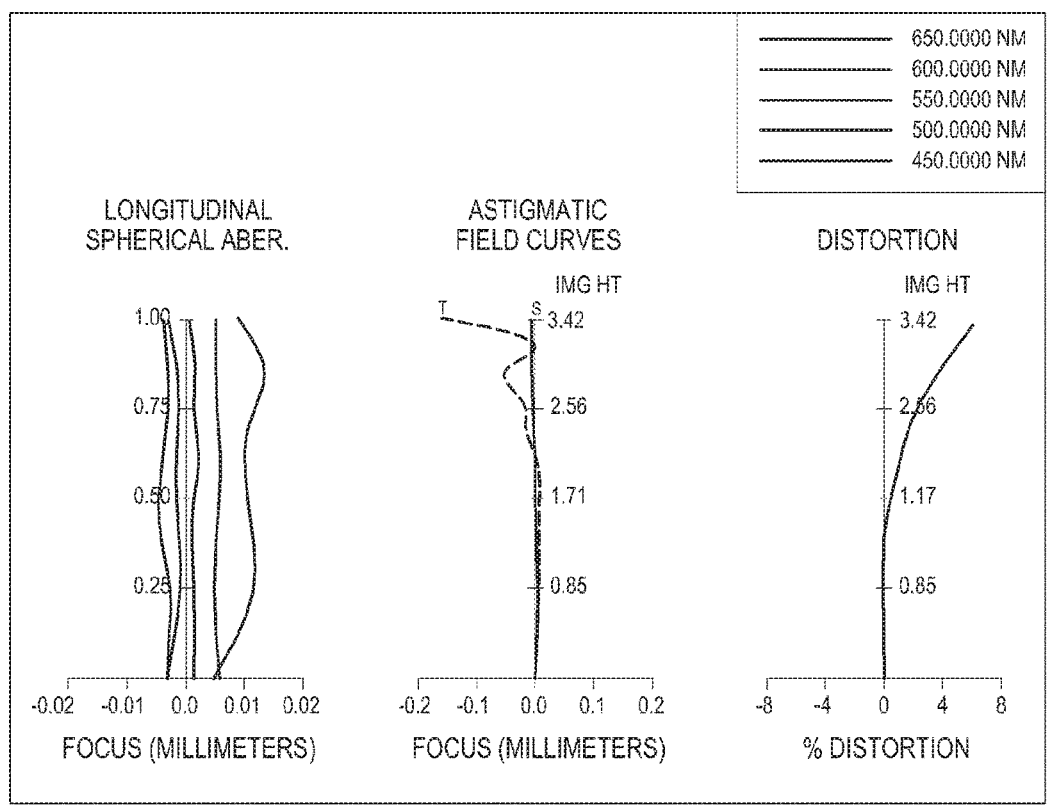
FIG. 3B illustrates an aberration diagram of an image capturing optical system according to the third embodiment of the present disclosure.

FIG. 3A illustrates an inner structure of an image capturing optical system 100 according to a third embodiment of the present disclosure. FIG. 3B illustrates an aberration diagram of an image capturing optical system 100 according to the third embodiment of the present disclosure.

Referring to FIGS. 3A and 3B and Tables 5 and 6, according to a third embodiment of the present disclosure, in the image capturing optical system 100, the valid focal length f of the optical system is 5.228 mm, the focal length f1 of the first lens 110 is −274.577 mm, the focal length f2 of the second lens 120 is 2.695 mm, the focal length f3 of the third lens 130 is −4.898 mm, the focal length f4 of the fourth lens 140 is 135.912 mm, the focal length f5 of the fifth lens 150 is 48.83 mm, and the focal length f6 of the sixth lens 160 is −7.036 mm.

TABLE 5

| Surface No. | Radius of curvature | Thickness | Refractive index | Remarks |
|---|---|---|---|---|
| 1 | 1.864 | 0.334 | 1.544 | First lens 110 |
| 2 | 1.725 | 0.120 | | |
| 3 | 1.702 | 0.623 | 1.544 | Second lens 120 |
| 4 | −9.160 | 0.034 | | |
| 5 | 7.968 | 0.350 | 1.642 | Third lens 130 |
| 6 | 2.211 | 0.476 | | |
| 7 | −7.366 | 0.777 | 1.64 | Fourth lens 140 |
| 8 | −7.069 | 0.497 | | |
| 9 | 2.522 | 0.500 | 1.544 | Fifth lens 150 |
| 10 | 2.593 | 0.751 | | |
| 11 | −3.582 | 0.400 | 1.535 | Sixth lens 160 |
| 12 | −79.009 | 0.188 | | |
| 13 | Infinity | 0.110 | 1.517 | IRCF |
| 14 | Infinity | 0.504 | | |
| 15 | Infinity | −0.001 | | Image Plane |

In Table 5, IRCF indicates an IR cut-off filter, and a reference wavelength of refractive index is 587.6 nm.

TABLE 6

| Types | 1 | 2 | 3 | 4 | 5 | 6 |
|---|---|---|---|---|---|---|
| Conic constant (K) | −1.45887 | −3.99633 | −0.02514 | 0.00000 | 51.62760 | 0.00000 |
| A(fourth-order term) | −0.02900 | −0.05144 | −0.07061 | −0.07451 | −0.16145 | −0.09626 |
| B(sixth-order term) | −0.01924 | −0.07985 | −0.01282 | 0.43298 | 0.49903 | 0.27316 |
| C(eighth-order term) | 0.03902 | 0.22870 | 0.08694 | −1.03877 | −1.10091 | −0.93806 |
| D(tenth-order term) | −0.06410 | −0.36380 | −0.08844 | 1.48747 | 1.55271 | 3.23506 |
| E(twelfth-order term) | 0.05435 | 0.36111 | 0.02242 | −1.40205 | −1.45528 | −7.59660 |

| Types | 7 | 8 | 9 | 10 | 11 | 12 |
|---|---|---|---|---|---|---|
| Conic constant (K) | 0.00000 | 0.00000 | 0.00000 | 0.00000 | 0.90727 | 0.00000 |
| A(fourth-order term) | −0.05836 | −0.10977 | −0.25407 | −0.20849 | −0.13297 | −0.12718 |
| B(sixth-order term) | 0.08574 | 0.15112 | 0.13764 | 0.11389 | 0.05792 | 0.06641 |
| C(eighth-order term) | −0.16290 | −0.17881 | −0.09409 | −0.06523 | 0.05626 | −0.01044 |
| D(tenth-order term) | 0.22802 | 0.17721 | 0.04923 | 0.02460 | −0.08588 | 0.00657 |
| E(twelfth-order term) | −0.19715 | −0.12024 | −0.01696 | −0.00412 | 0.05165 | 0.00449 |

According to the third embodiment of the present disclosure, Inequality (1) satisfies $|f_2/f_3|=0.55$. Inequality (2) satisfies $f/f_2=1.939$, Inequality (3) satisfies OTL5/CT5=7.42, and Equation (1) satisfies $Vd_3/Vd_4=0.957$.

Fourth Embodiment

Table 7 below represents numerical examples as per Inequalities (1)-(3) and Equation (1) according to an embodiment of the present disclosure, and Table 8 below represents aspherical coefficients of Inequality (1).

Figure 4A:
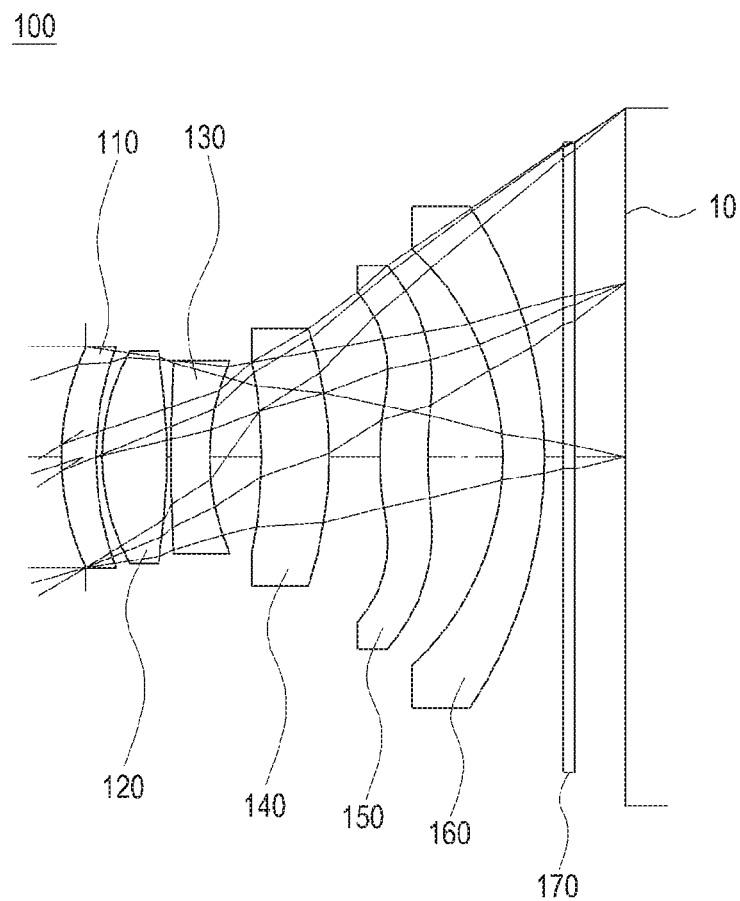
FIG. 4A illustrates an inner structure of an image capturing optical system according to a fourth embodiment of the present disclosure.
Figure 4B:
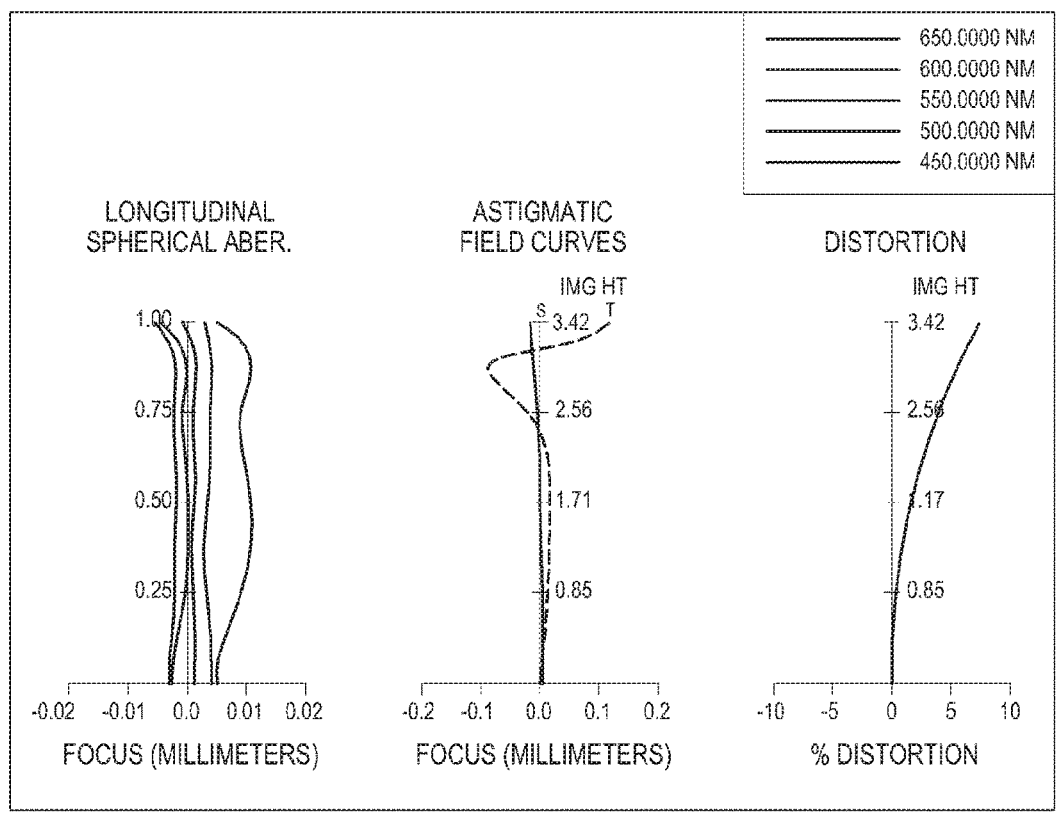
FIG. 4B illustrates an aberration diagram of an image capturing optical system according to the fourth embodiment of the present disclosure.

FIG. 4A illustrates an inner structure of an image capturing optical system 100 according to a fourth embodiment of the present disclosure. FIG. 4B illustrates an aberration diagram of an image capturing optical system 100 according to the fourth embodiment of the present disclosure.

Referring to FIGS. 4A and 4B and Tables 7 and 8, according to a fourth embodiment of the present disclosure, in the image capturing optical system 100, the valid focal length f of the optical system is 5.263 mm, the focal length f1 of the first lens 110 is −252.206 mm, the focal length f2 of the second lens 120 is 2.703 mm, the focal length f3 of the third lens 130 is −5.395 mm, the focal length f4 of the fourth lens 140 is 500.015 mm, the focal length f5 of the fifth lens 150 is 116.566 mm, and the focal length f6 of the sixth lens 160 is −6.885 mm.

TABLE 7

| Surface No. | Radius of curvature | Thickness | Refractive index | Remarks |
|---|---|---|---|---|
| 1 | 1.865 | 0.330 | 1.544 | First lens 110 |
| 2 | 1.725 | 0.120 | | |
| 3 | 1.699 | 0.695 | 1.544 | Second lens 120 |
| 4 | −9.280 | 0.031 | | |
| 5 | 7.922 | 0.300 | 1.65 | Third lens 130 |
| 6 | 2.391 | 0.499 | | |
| 7 | −5.109 | 0.718 | 1.65 | Fourth lens 140 |
| 8 | −5.308 | 0.497 | | |
| 9 | 3.168 | 0.523 | 1.544 | Fifth lens 150 |
| 10 | 3.141 | 0.752 | | |
| 11 | −3.503 | 0.400 | 1.535 | Sixth lens 160 |
| 12 | −76.416 | 0.188 | | |
| 13 | Infinity | 0.110 | 1.517 | IRCF |
| 14 | Infinity | 0.503 | | |
| 15 | Infinity | −0.001 | | Image Plane |

In Table 7, IRCF indicates an IR cut-off filter, and a reference wavelength of refractive index is 587.6 nm.

TABLE 8

| Types | 1 | 2 | 3 | 4 | 5 | 6 |
|---|---|---|---|---|---|---|
| Conic constant (K) | −1.44879 | −4.00441 | −0.02150 | 0.00000 | 51.77149 | 0.00000 |
| A(fourth-order term) | −0.02852 | −0.05092 | −0.07251 | −0.07472 | −0.16082 | −0.09076 |
| B(sixth-order term) | −0.02335 | −0.07814 | −0.00408 | 0.43275 | 0.49951 | 0.25112 |
| C(eighth-order term) | 0.05672 | 0.24152 | 0.06453 | −1.03873 | −1.10087 | −0.76766 |
| D(tenth-order term) | −0.09480 | −0.39614 | −0.03615 | 1.48756 | 1.55267 | 2.29816 |
| E(twelfth-order term) | 0.08084 | 0.38582 | −0.06606 | −1.40199 | −1.45525 | −4.48786 |

| Types | 7 | 8 | 9 | 10 | 11 | 12 |
|---|---|---|---|---|---|---|
| Conic constant (K) | 0.00000 | 0.00000 | 0.00000 | 0.00000 | 1.63533 | 0.00000 |
| A(fourth-order term) | −0.05628 | −0.10315 | −0.24868 | −0.20292 | −0.13297 | −0.12433 |
| B(sixth-order term) | 0.07419 | 0.14170 | 0.13627 | 0.11189 | 0.05792 | 0.06858 |
| C(eighth-order term) | −0.13628 | −0.18117 | −0.10014 | −0.06370 | 0.05626 | −0.01360 |
| D(tenth-order term) | 0.16660 | 0.20030 | 0.06235 | 0.02383 | −0.08588 | −0.00443 |
| E(twelfth-order term) | −0.11406 | −0.15782 | −0.03234 | −0.00389 | 0.05165 | 0.00353 |

According to the fourth embodiment of the present disclosure, Inequality (1) satisfies $|f_2/f_3|=0.5$. Inequality (2) satisfies: $f/f_2=1.947$, Inequality (3) satisfies OTL5/CT5=7.09, and Equation (1) satisfies: $Vd_3/Vd_4=1$.

Fifth Embodiment

Table 9 below represents numerical examples as per Inequalities (1)-(3) and Equation (1) according to an embodiment of the present disclosure, and Table 10 below represents aspherical coefficients of Inequality (1).

Figure 5A:
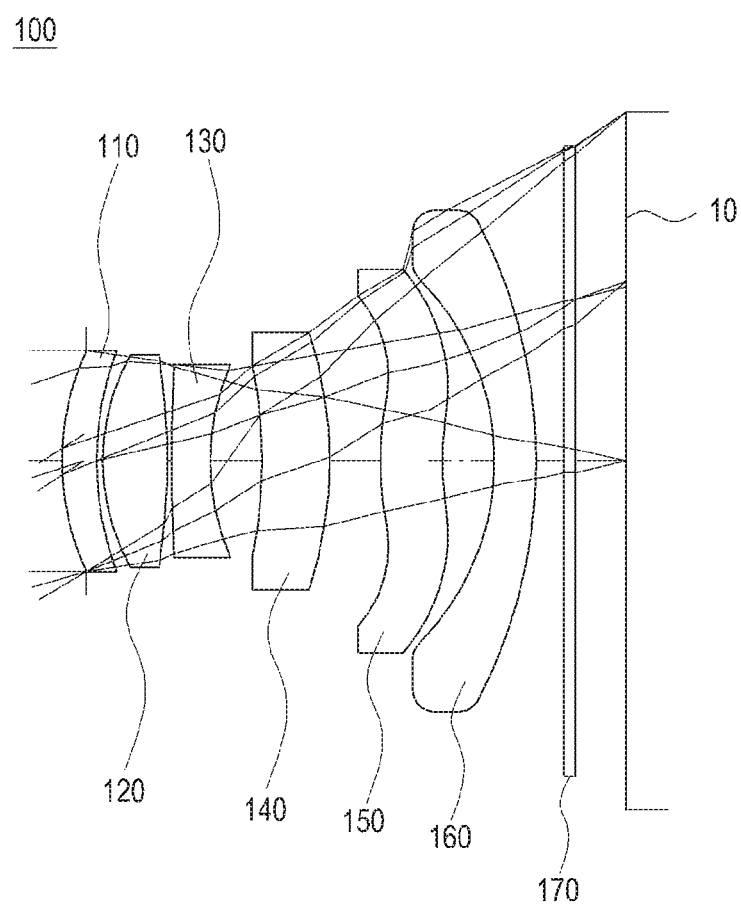
FIG. 5A illustrates an inner structure of an image capturing optical system according to a fifth embodiment of the present disclosure.
Figure 5B:
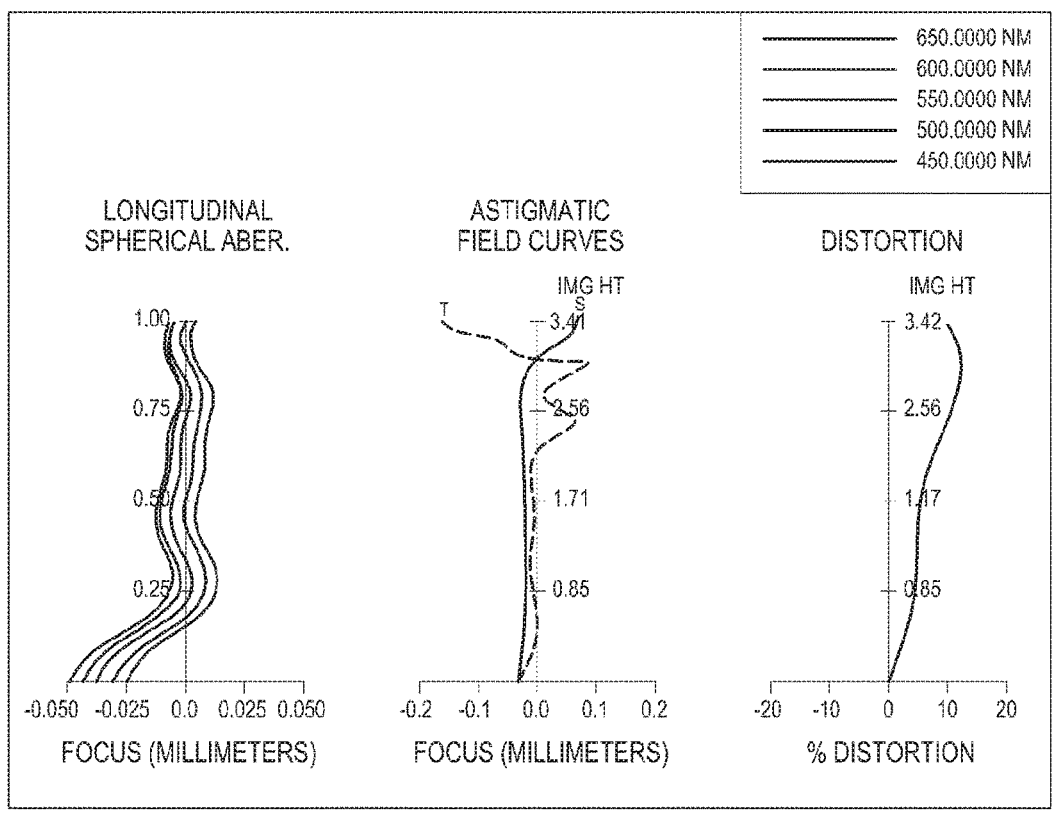
FIG. 5B illustrates an aberration diagram of an image capturing optical system according to the fifth embodiment of the present disclosure.

FIG. 5A illustrates an inner structure of an image capturing optical system 100 according to a fifth embodiment of the present disclosure. FIG. 5B illustrates an aberration diagram of an image capturing optical system 100 according to the fifth embodiment of the present disclosure.

Referring to FIGS. 5A and 5B and Tables 9 and 10, according to a fifth embodiment of the present disclosure, in the image capturing optical system 100, the valid focal length f of the optical system is 4.244 mm, the focal length f1 of the first lens 110 is 79.097 mm, the focal length f2 of the second lens 120 is 2.847 mm, the focal length f3 of the third lens 130 is −5.249 mm, the focal length f4 of the fourth lens 140 is 31.224 mm, the focal length f5 of the fifth lens 150 is 42.979 mm, and the focal length f6 of the sixth lens 160 is −16.213 mm.

TABLE 9

| Surface No. | Radius of curvature | Thickness | Refractive index | Remarks |
|---|---|---|---|---|
| 1 | 1.817 | 0.330 | 1.544 | First lens 110 |
| 2 | 1.775 | 0.070 | | |
| 3 | 1.898 | 0.556 | 1.544 | Second lens 120 |
| 4 | −7.510 | 0.030 | | |
| 5 | 8.750 | 0.368 | 1.642 | Third lens 130 |
| 6 | 2.387 | 0.565 | | |
| 7 | 72.065 | 0.440 | 1.641 | Fourth lens 140 |
| 8 | −27.477 | 0.451 | | |
| 9 | 2.896 | 0.689 | 1.544 | Fifth lens 150 |
| 10 | 2.936 | 0.371 | | |
| 11 | −4.253 | 0.400 | 1.535 | Sixth lens 160 |
| 12 | −8.631 | 0.186 | | |
| 13 | Infinity | 0.110 | 1.517 | IRCF |
| 14 | Infinity | 0.473 | | |
| 15 | Infinity | 0.031 | | Image Plane |

In Table 9, IRCF indicates an IR cut-off filter, and a reference wavelength of refractive index is 587.6 nm.

TABLE 10

| Types | 1 | 2 | 3 | 4 | 5 | 6 | 7 |
|---|---|---|---|---|---|---|---|
| Conic constant (K) | −1.92696 | −3.36032 | 0.00004 | −174.11915 | 53.35811 | 0.05879 | −1378.10482 |
| A(fourth-order term) | −0.02891 | −0.08595 | −0.10965 | −0.11829 | −0.16610 | −0.11536 | −0.10700 |
| B(sixth-order term) | 0.03930 | 0.20536 | 0.60624 | 0.49202 | 0.50044 | 0.33374 | 0.15318 |
| C(eighth-order term) | −0.16988 | −1.05446 | −3.04136 | −1.22266 | −1.09946 | −1.31296 | −0.26581 |
| D(tenth-order term) | 0.24601 | 2.46760 | 8.45993 | 2.02192 | 1.55338 | 5.15276 | 0.35952 |
| E(twelfth-order term) | −0.17452 | −2.92601 | −13.53395 | −2.27144 | −1.45530 | −14.08917 | −0.29984 |

| Types | 8 | 9 | 10 | 11 | 12 |
|---|---|---|---|---|---|
| Conic constant (K) | 60.47296 | 0.60380 | −1.02833 | 0.00323 | −1342.13672 |
| A(fourth-order term) | −0.18104 | −0.21253 | −0.14218 | −0.05573 | −0.00735 |
| B(sixth-order term) | 0.22820 | 0.07934 | 0.06384 | 0.03443 | −0.02761 |
| C(eighth-order term) | −0.29221 | −0.03741 | −0.03043 | 0.00630 | 0.02824 |
| D(tenth-order term) | 0.32942 | −0.02254 | 0.00948 | −0.02082 | −0.01376 |
| E(twelfth-order term) | −0.24291 | 0.06975 | −0.00130 | 0.01317 | 0.00387 |

According to the fifth embodiment of the present disclosure, Inequality (1) satisfies $|f_2/f_3|=0.542$. Inequality (2) satisfies $f/f_2=1.491$, Inequality (3) satisfies OTL5/CT5=5.078, and Equation (1) satisfies: $Vd_3/Vd_4=0.957$.

Sixth Embodiment

Table 11 below represents numerical examples as per Inequalities (1)-(3) and Equation (1) according to an embodiment of the present disclosure, and Table 12 below represents aspherical coefficients of Inequality (1).

Figure 6A:
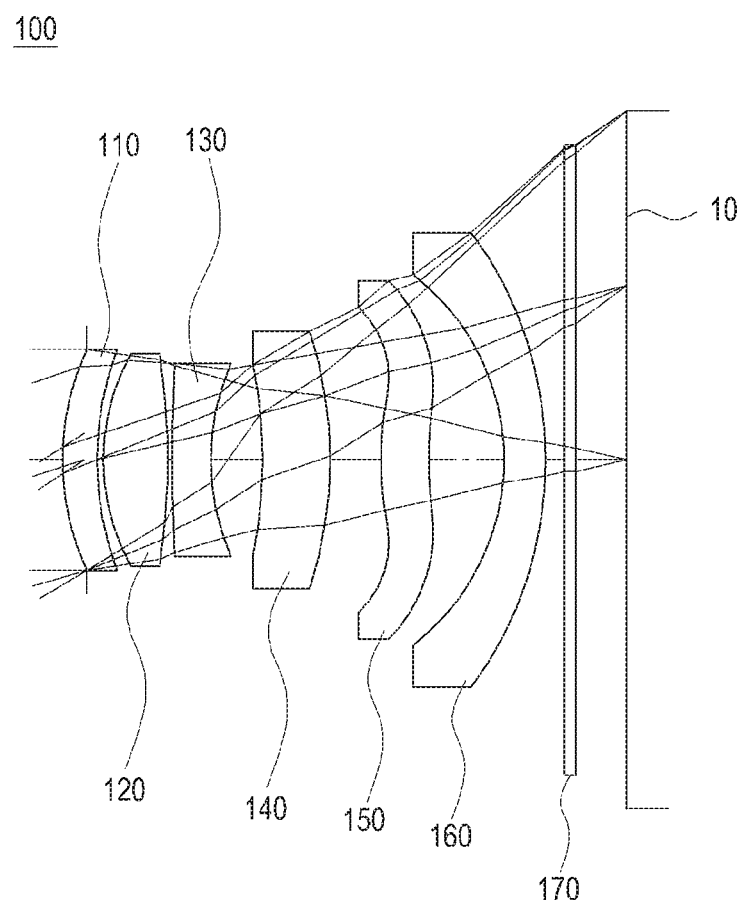
FIG. 6A illustrates an inner structure of an image capturing optical system according to a sixth embodiment of the present disclosure.
Figure 6B:
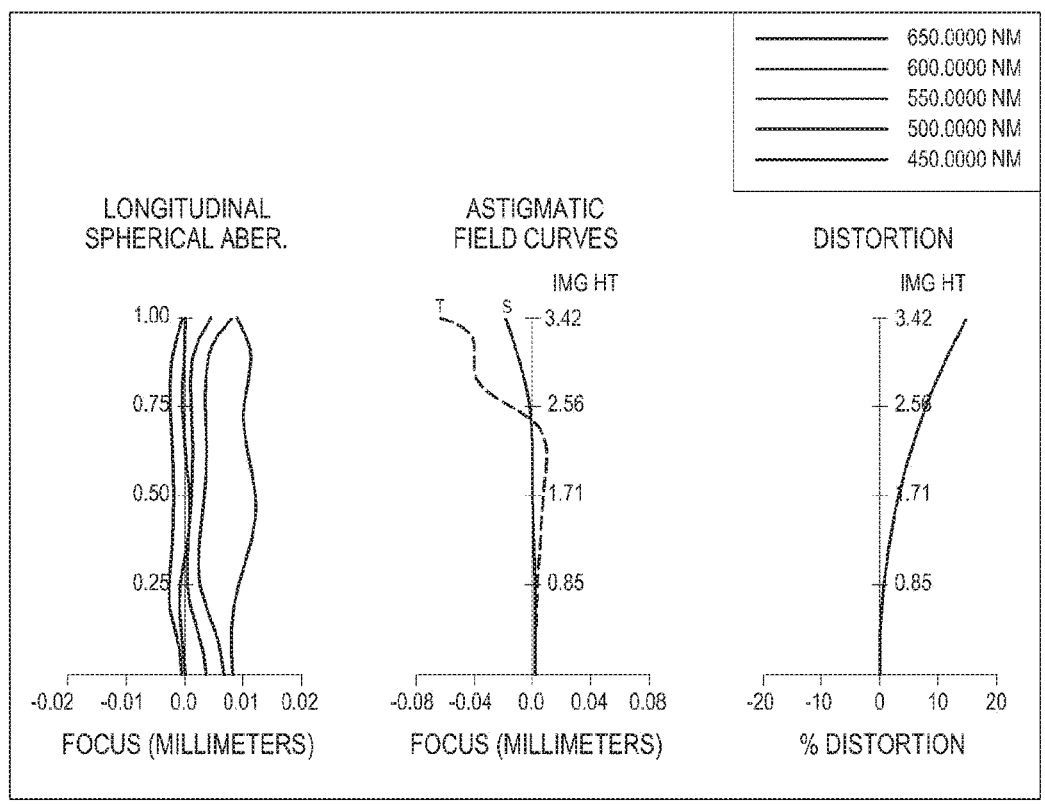
FIG. 6B illustrates an aberration diagram of an image capturing optical system according to the sixth embodiment of the present disclosure.

FIG. 6A illustrates an inner structure of an image capturing optical system 100 according to a sixth embodiment of the present disclosure. FIG. 6B is a graph illustrating an aberration diagram of an image capturing optical system 100 according to the sixth embodiment of the present disclosure.

Referring to FIGS. 6A and 6B and Tables 11 and 12, according to a sixth embodiment of the present disclosure, in the image capturing optical system 100, the valid focal length f of the optical system is 5.373 mm, the focal length f1 of the first lens 110 is 54.728 mm, the focal length f2 of the second lens 120 is 2.872 mm, the focal length f3 of the third lens 130 is −5.550 mm, the focal length f4 of the fourth lens 140 is 495.157 mm, the focal length f5 of the fifth lens 150 is 75.139 mm, and the focal length f6 of the sixth lens 160 is −6.187 mm.

TABLE 11

| Surface No. | Radius of curvature | Thickness | Refractive index | Remarks |
|---|---|---|---|---|
| 1 | 1.870 | 0.334 | 1.544 | First lens 110 |
| 2 | 1.870 | 0.136 | | |
| 3 | 1.804 | 0.605 | 1.544 | Second lens 120 |
| 4 | −10.204 | 0.040 | | |
| 5 | 7.888 | 0.300 | 1.65 | Third lens 130 |
| 6 | 2.435 | 0.561 | | |
| 7 | −4.429 | 0.706 | 1.65 | Fourth lens 140 |
| 8 | −4.643 | 0.521 | | |
| 9 | 4.587 | 0.538 | 1.544 | Fifth lens 150 |
| 10 | 4.954 | 0.771 | | |
| 11 | −3.163 | 0.400 | 1.535 | Sixth lens 160 |
| 12 | −76.811 | 0.188 | | |
| 13 | Infinity | 0.110 | 1.517 | IRCF |
| 14 | Infinity | 0.506 | | |
| 15 | Infinity | −0.003 | | Image Plane |

In Table 11, IRCF indicates an IR cut-off filter, and a reference wavelength of refractive index is 587.6 nm.

TABLE 12

| Types | 1 | 2 | 3 | 4 | 5 | 6 |
|---|---|---|---|---|---|---|
| Conic constant (K) | −1.37877 | −4.18648 | −0.00056 | 0.00000 | 51.82806 | 0.00000 |
| A(fourth-order term) | −0.02716 | −0.06370 | −0.07253 | −0.07507 | −0.16021 | −0.09019 |
| B(sixth-order term) | −0.01316 | −0.03839 | 0.00615 | 0.43238 | 0.49994 | 0.29871 |
| C(eighth-order term) | 0.02557 | 0.12943 | 0.05342 | −1.03860 | −1.10107 | −1.17275 |
| D(tenth-order term) | −0.04828 | −0.21759 | −0.08382 | 1.48764 | 1.55275 | 4.39590 |
| E(twelfth-order term) | 0.04252 | 0.22811 | 0.08427 | −1.40202 | −1.45486 | −11.22167 |

| Types | 7 | 8 | 9 | 10 | 11 | 12 |
|---|---|---|---|---|---|---|
| Conic constant (K) | 0.00000 | 0.00000 | 0.00000 | 0.00000 | 1.79745 | 0.00000 |
| A(fourth-order term) | −0.04611 | −0.08754 | −0.22972 | −0.18680 | −0.13297 | −0.12394 |
| B(sixth-order term) | 0.06559 | 0.12141 | 0.12309 | 0.10000 | 0.05792 | 0.07540 |
| C(eighth-order term) | −0.09948 | −0.15693 | −0.09483 | −0.05549 | 0.05626 | −0.02312 |
| D(tenth-order term) | 0.10247 | 0.18072 | 0.06457 | 0.01987 | −0.08588 | 0.00185 |
| E(twelfth-order term) | −0.05389 | −0.15274 | −0.03978 | −0.00298 | 0.05165 | 0.00104 |

According to the sixth embodiment of the present disclosure, Inequality (1) satisfies $|f_2/f_3|=0.517$. Inequality (2) satisfies $f/f_2=1.871$, Inequality (3) satisfies $OTL5/CT5=6.957$, and Equation (1) satisfies $Vd_3/Vd_4=1.0$.

Seventh Embodiment

Table 13 below represents numerical examples as per Inequalities (1)-(3) and Equation (1) according to an embodiment of the present disclosure, and Table 14 below represents aspherical coefficients of Inequality (1).

Figure 7A:
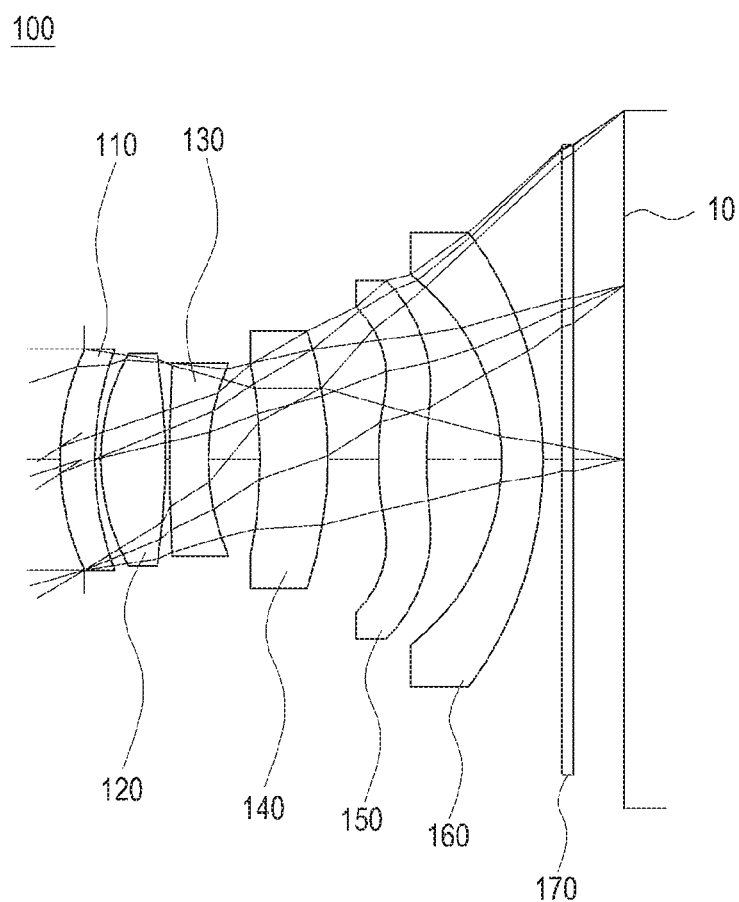
FIG. 7A illustrates an inner structure of an image capturing optical system according to a seventh embodiment of the present disclosure.
Figure 7B:
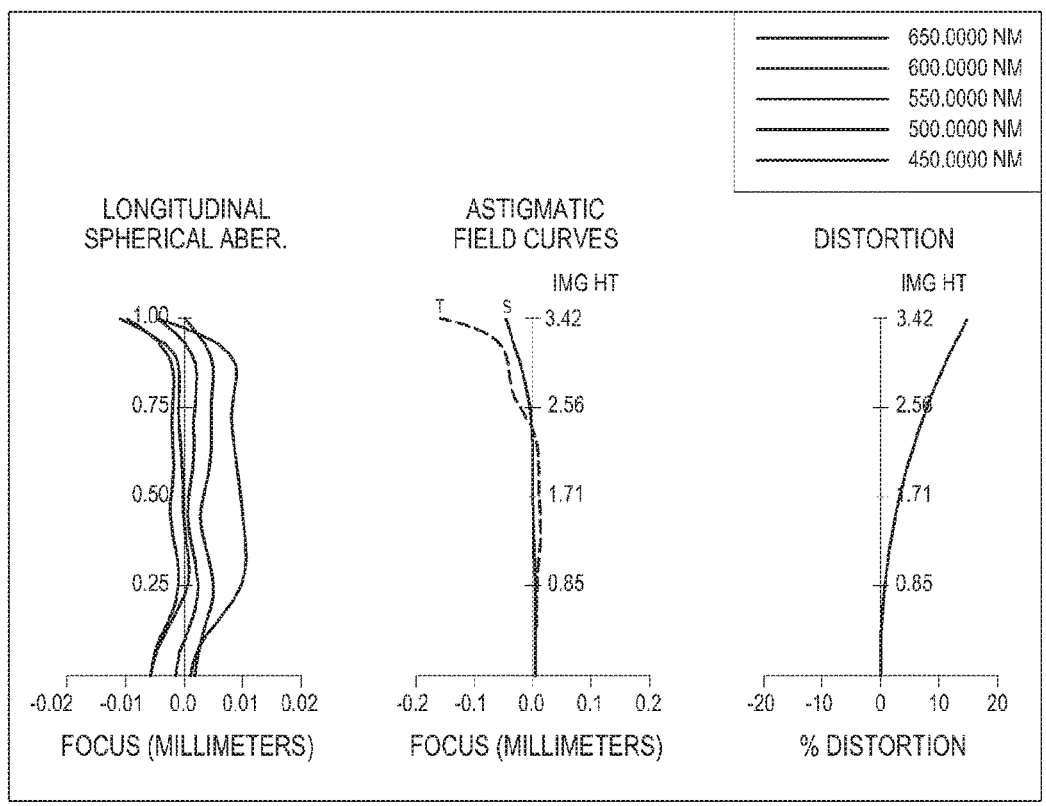
FIG. 7B illustrates an aberration diagram of an image capturing optical system according to the seventh embodiment of the present disclosure.

FIG. 7A illustrates an inner structure of an image capturing optical system 100 according to a seventh embodiment of the present disclosure. FIG. 7B illustrates an aberration diagram of an image capturing optical system 100 according to the seventh embodiment of the present disclosure.

Referring to FIGS. 7A and 7B and Tables 13 and 14, according to a seventh embodiment of the present disclosure, in the image capturing optical system 100, the valid focal length f of the optical system is 5.284 mm, the focal length f1 of the first lens 110 is 44.716 mm, the focal length f2 of the second lens 120 is 2.907 mm, the focal length f3 of the third lens 130 is −5.403 mm, the focal length f4 of the fourth lens 140 is 70.845 mm, the focal length f5 of the fifth lens 150 is 30.583 mm, and the focal length f6 of the sixth lens 160 is −5.435 mm.

TABLE 13

| Surface No. | Radius of curvature | Thickness | Refractive index | Remarks |
|---|---|---|---|---|
| 1 | 1.870 | 0.330 | 1.544 | First lens 110 |
| 2 | 1.900 | 0.130 | | |
| 3 | 1.852 | 0.547 | 1.544 | Second lens 120 |
| 4 | −9.636 | 0.030 | | |
| 5 | 7.870 | 0.300 | 1.65 | Third lens 130 |
| 6 | 2.388 | 0.631 | | |
| 7 | −3.447 | 0.600 | 1.614 | Fourth lens 140 |
| 8 | −3.405 | 0.498 | | |
| 9 | 5.008 | 0.597 | 1.544 | Fifth lens 150 |
| 10 | 6.866 | 0.811 | | |
| 11 | −2.792 | 0.400 | 1.535 | Sixth lens 160 |
| 12 | −76.057 | 0.188 | | |
| 13 | Infinity | 0.110 | 1.517 | IRCF |
| 14 | Infinity | 0.501 | | |
| 15 | Infinity | 0.001 | | Image Plane |

In Table 13, IRCF indicates an IR cut-off filter, and a reference wavelength of refractive index is 587.6 nm.

TABLE 14

| Types | 1 | 2 | 3 | 4 | 5 | 6 |
|---|---|---|---|---|---|---|
| Conic constant (K) | −1.37487 | −4.21785 | 0.00856 | 0.00000 | 52.00308 | 0.00000 |
| A(fourth-order term) | −0.02527 | −0.05896 | −0.06969 | −0.07540 | −0.16071 | −0.08337 |
| B(sixth-order term) | −0.02153 | −0.08698 | 0.01208 | 0.43205 | 0.49960 | 0.29168 |
| C(eighth-order term) | 0.04574 | 0.26645 | −0.08902 | −1.03865 | −1.10151 | −1.28416 |
| D(tenth-order term) | −0.07829 | −0.43680 | 0.49159 | 1.48768 | 1.55246 | 5.46303 |
| E(twelfth-order term) | 0.06960 | 0.44648 | −1.03372 | −1.40198 | −1.45490 | −15.66614 |

| Types | 7 | 8 | 9 | 10 | 11 | 12 |
|---|---|---|---|---|---|---|
| Conic constant (K) | 0.00000 | 0.00000 | 0.00000 | 0.00000 | 1.05423 | 0.00000 |
| A(fourth-order term) | −0.05283 | −0.10665 | −0.21516 | −0.16027 | −0.13297 | −0.12421 |
| B(sixth-order term) | 0.06015 | 0.13066 | 0.11952 | 0.07926 | 0.05792 | 0.07424 |
| C(eighth-order term) | −0.06603 | −0.15640 | −0.09351 | −0.04098 | 0.05626 | −0.02255 |
| D(tenth-order term) | 0.03246 | 0.16695 | 0.06622 | 0.01356 | −0.08588 | 0.00178 |
| E(twelfth-order term) | 0.03077 | −0.13484 | −0.04215 | −0.00185 | 0.05165 | 0.00101 |

According to the seventh embodiment of the present disclosure, Inequality (1) satisfies $|f_2/f_3|=0.538$. Inequality (2) satisfies $f/f_2=1.817$, Inequality (3) satisfies OTL5/CT5=6.134, and Equation (1) satisfies $Vd_3/Vd_4=0.830$.

Eighth Embodiment

Table 15 below represents numerical examples as per Inequalities (1)-(3) and Equation (1) according to an embodiment of the present disclosure, and Table 16 below represents aspherical coefficients of Inequality (1).

Figure 8A:
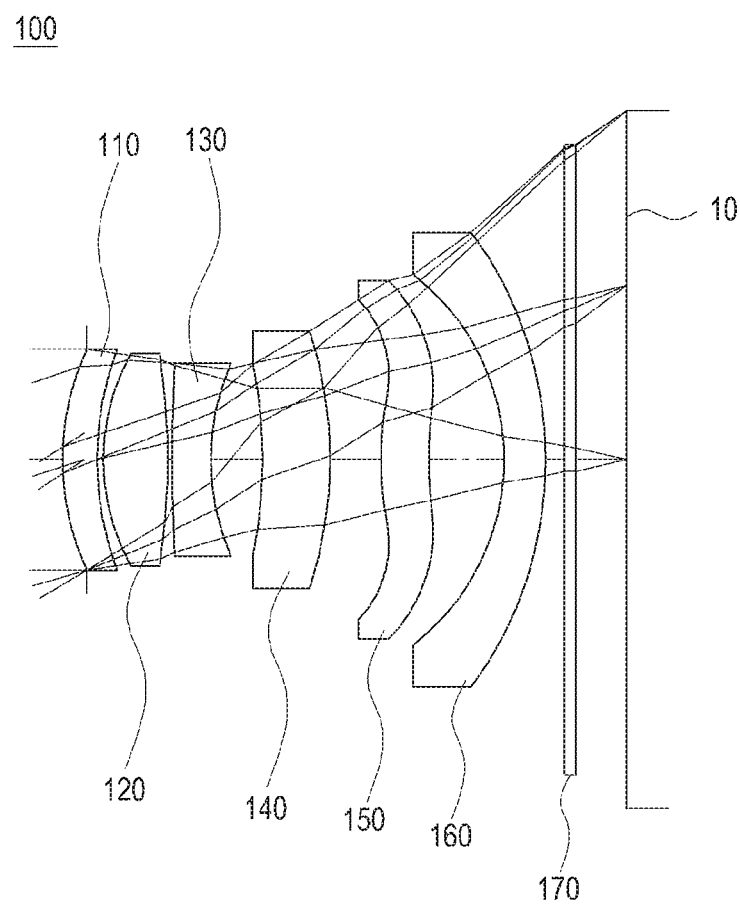
FIG. 8A illustrates an inner structure of an image capturing optical system according to an eighth embodiment of the present disclosure.
Figure 8B:
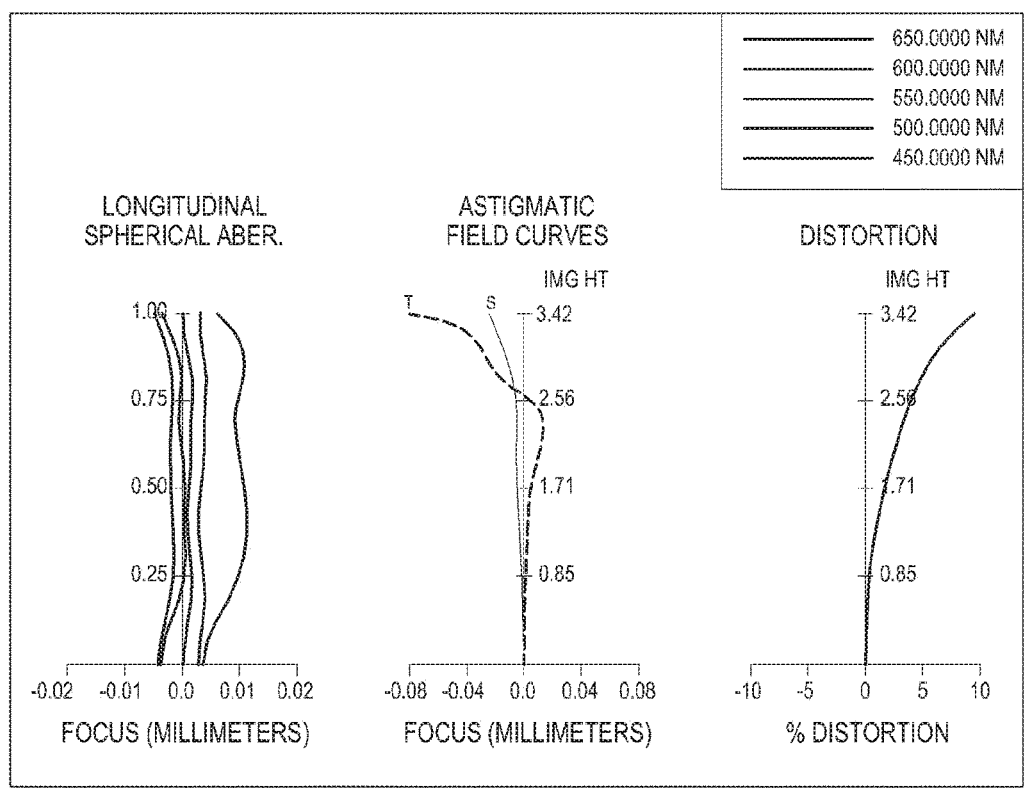
FIG. 8B illustrates an aberration diagram of an image capturing optical system according to the eighth embodiment of the present disclosure.

FIG. 8A illustrates an inner structure of an image capturing optical system 100 according to an eighth embodiment of the present disclosure. FIG. 8B illustrates an aberration diagram of an image capturing optical system 100 according to the eighth embodiment of the present disclosure.

Referring to FIGS. 8A and 8B and Tables 15 and 16, according to an eighth embodiment of the present disclosure, in the image capturing optical system 100, the valid focal length f of the optical system is 5.274 mm, the focal length f1 of the first lens 110 is 43.283 mm, the focal length f2 of the second lens 120 is 2.914 mm, the focal length f3 of the third lens 130 is −5.346 mm, the focal length f4 of the fourth lens 140 is 352.007 mm, the focal length f5 of the fifth lens 150 is 14.728 mm, and the focal length f6 of the sixth lens 160 is −4.558 mm.

TABLE 15

| Surface No. | Radius of curvature | Thickness | Refractive index | Remarks |
|---|---|---|---|---|
| 1 | 1.870 | 0.330 | 1.544 | First lens 110 |
| 2 | 1.905 | 0.130 | | |
| 3 | 1.834 | 0.556 | 1.544 | Second lens 120 |
| 4 | −10.355 | 0.035 | | |
| 5 | 7.856 | 0.300 | 1.65 | Third lens 130 |
| 6 | 2.369 | 0.601 | | |
| 7 | −3.546 | 0.600 | 1.614 | Fourth lens 140 |
| 8 | −3.713 | 0.452 | | |
| 9 | 5.465 | 0.546 | 1.544 | Fifth lens 150 |
| 10 | 16.622 | 0.891 | | |
| 11 | −2.352 | 0.400 | 1.535 | Sixth lens 160 |
| 12 | −72.581 | 0.188 | | |
| 13 | Infinity | 0.110 | 1.517 | IRCF |
| 14 | Infinity | 0.502 | | |
| 15 | Infinity | 0.000 | | Image Plane |

In Table 15, IRCF indicates an IR cut-off filter, and a reference wavelength of refractive index is 587.6 nm.

TABLE 16

| Types | 1 | 2 | 3 | 4 | 5 | 6 |
|---|---|---|---|---|---|---|
| Conic constant (K) | −1.33884 | −4.22984 | 0.01940 | 0.00000 | 51.94640 | 0.00000 |
| A(fourth-order term) | −0.02602 | −0.06469 | −0.07570 | −0.07679 | −0.16095 | −0.08669 |
| B(sixth-order term) | −0.00857 | −0.02059 | 0.05601 | 0.43094 | 0.49888 | 0.32014 |
| C(eighth-order term) | 0.01378 | 0.05646 | −0.20534 | −1.03877 | −1.10315 | −1.37334 |
| D(tenth-order term) | −0.03442 | −0.06808 | 0.62607 | 1.48776 | 1.55109 | 5.43295 |
| E(twelfth-order term) | 0.03448 | 0.06549 | −1.03758 | −1.40198 | −1.45565 | −14.48183 |

| Types | 7 | 8 | 9 | 10 | 11 | 12 |
|---|---|---|---|---|---|---|
| Conic constant (K) | 0.00000 | 0.00000 | 0.00000 | 0.00000 | 0.55921 | 0.00000 |
| A(fourth-order term) | −0.06244 | −0.12231 | −0.21603 | −0.14196 | −0.13297 | −0.13109 |
| B(sixth-order term) | 0.06915 | 0.14545 | 0.12791 | 0.06477 | 0.05792 | 0.07306 |
| C(eighth-order term) | −0.07749 | −0.17219 | −0.11043 | −0.03197 | 0.05626 | −0.02126 |
| D(tenth-order term) | 0.04693 | 0.17685 | 0.08723 | 0.00986 | −0.08588 | 0.00090 |
| E(twelfth-order term) | 0.01258 | −0.13482 | −0.05797 | −0.00124 | 0.05165 | 0.00143 |

According to the eighth embodiment of the present disclosure, Inequality (1) satisfies |f$_2$/f$_3$|=0.545, Inequality (2) satisfies: f/f$_2$=1.81, Inequality (3) satisfies OTL5/CT5=6.500, and Equation (1) satisfies Vd$_3$/Vd$_4$=0.830.

The embodiments herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claims and their equivalents.

What is claimed is:

1. An image capturing optical system, comprising:
in order from an object side,
a first lens having positive refractive power and including a convex object side surface and a concave image side surface;
a second lens having positive refractive power and including a convex object side surface and a convex image side surface;
a third lens having negative refractive power including a convex object side surface and a concave image side surface;
a fourth lens having positive refractive power including a concave object side surface and a convex image side surface;
a fifth lens having positive refractive power and including a convex object side surface and a concave image side surface; and
a sixth lens having negative refractive power and including a concave object side surface and a convex image side surface,
wherein the image capturing optical system satisfies the following:

$$1.5 < f/f_2 < 2.5, \text{ and}$$

$$4.5 < OTL5/CT5 < 10.0,$$

wherein f is a focal length of the image capturing optical system, f$_2$ is a focal length of the second lens, OTL5 is a distance on an optical axis from the convex object side surface of the first lens to the concave image side surface of the fifth lens, and CT5 is a thickness of a center of the fifth lens.

2. The image capturing optical system of claim 1, wherein the image capturing optical system satisfies the following inequality:

$$0.45 < |f_2/f_3| < 1.0$$

wherein f$_3$ is a focal length of the third lens.

3. The image capturing optical system of claim 1, wherein the image capturing optical system satisfies the following Equation:

$$0.35 < |Vd_3/Vd_4| = 1$$

wherein Vd$_3$ is an Abbe number of the third lens, and Vd$_4$ is an Abbe number of the fourth lens.

4. The image capturing optical system of claim 1, further comprising an optical filter between the sixth lens and an image sensor.

5. An image capturing optical system, comprising:
in order from an object side,
a first lens having negative refractive power and including a convex object side surface and a concave image side surface;
a second lens having positive refractive power and including a convex object side surface and a convex image side surface;
a third lens having negative refractive power including a convex object side surface and a concave image side surface;
a fourth lens having positive refractive power including a concave object side surface and a convex image side surface;
a fifth lens having positive refractive power and including a convex object side surface and a concave image side surface; and
a sixth lens having negative refractive power and including a concave object side surface and a convex image side surface,
wherein the image capturing optical system satisfies the following:

$$1.5 < f/f_2 < 2.5, \text{ and}$$

$$4.5 < OTL5/CT5 < 10.0,$$

wherein f is a focal length of the image capturing optical system, f$_2$ is a focal length of the second lens, OTL5 is a distance on an optical axis from the convex object side surface of the first lens to the concave image side surface of the fifth lens, and CT5 is a thickness of a center of the fifth lens.

6. The image capturing optical system of claim 5, wherein the image capturing optical system satisfies the following Inequality:

$$0.45 < |f_2/f_3| < 1.0$$

wherein f$_2$ is a focal length of the second lens, and f$_3$ is a focal length of the third lens.

7. The image capturing optical system of claim 5, wherein the image capturing optical system satisfies the following Equation:

$$0.35 < |Vd_3/Vd_4| = 1$$

wherein Vd$_3$ is an Abbe number of the third lens, and Vd$_4$ is an Abbe number of the fourth lens.

8. The image capturing optical system of claim 5, further comprising an optical filter between the sixth lens and an image sensor.

9. An image capturing optical system, comprising:
in order from an object side,
a first lens having positive or negative refractive power and including a convex object side surface and a concave image side surface;
a second lens having positive refractive power and including a convex object side surface and a convex image side surface;
a third lens having negative refractive power including a convex object side surface and a concave image side surface;
a fourth lens having positive refractive power including a concave object side surface and a convex image side surface;
a fifth lens having positive refractive power and including a convex object side surface and a concave image side surface; and
a sixth lens having negative refractive power and including a concave object side surface and a convex image side surface, wherein the image capturing optical system satisfies the following:

$0.45 < |f_2/f_3| < 1.0$, $1.5 < f/f_2 < 2.5$, $4.5 < OTL5/CT5 < 10.0$, and $0.35 < |Vd_3/Vd_4| = 1$ wherein f is a focal length of the image capturing optical system, $f_2$ is a focal length of the second lens, $f_3$ is a focal length of the third lens, OTL5 is a distance on an optical axis from the convex object side surface of the first lens to of the concave image side surface of the fifth lens, CT5 is a thickness of a center of the fifth lens, $Vd_3$ is an Abbe number of the third lens, and $Vd_4$ is an Abbe number of the fourth lens.

* * * * *